US012321123B2

(12) United States Patent
Aihara et al.

(10) Patent No.: US 12,321,123 B2
(45) Date of Patent: Jun. 3, 2025

(54) CHARGE ELIMINATING APPARATUS, IMAGE FORMING APPARATUS, AND CHARGE ADJUSTING APPARATUS

(71) Applicant: CANON KABUSHIKI KAISHA, Tokyo (JP)

(72) Inventors: Ryo Aihara, Chiba (JP); Shin Ono, Ibaraki (JP); Yutaka Kakehi, Chiba (JP); Yasuharu Chiyoda, Chiba (JP); Keisuke Mogi, Chiba (JP); Shingo Iwami, Tokyo (JP); Ryosuke Tsuruga, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/424,583

(22) Filed: Jan. 26, 2024

(65) Prior Publication Data

US 2024/0255884 A1 Aug. 1, 2024

(30) Foreign Application Priority Data

Jan. 30, 2023 (JP) ................................ 2023-011451
Nov. 20, 2023 (JP) ................................ 2023-197019

(51) Int. Cl.
*G03G 15/00* (2006.01)
*B65H 29/12* (2006.01)

(52) U.S. Cl.
CPC ....... *G03G 15/6573* (2013.01); *B65H 29/125* (2013.01); *G03G 15/5037* (2013.01); *B65H 2301/5133* (2013.01)

(58) Field of Classification Search
CPC ........... G03G 15/6573; G03G 15/5037; B65H 29/125; B65H 2301/5133
See application file for complete search history.

(56) References Cited

U.S. PATENT DOCUMENTS

| | | | | |
|---|---|---|---|---|
| 2012/0002985 | A1* | 1/2012 | Katayama | G03G 15/161 399/53 |
| 2019/0107798 | A1* | 4/2019 | Miyamoto | G03G 15/5029 |
| 2021/0216031 | A1 | 7/2021 | Tanaka | |
| 2021/0356891 | A1* | 11/2021 | Koide | G03G 15/6558 |

FOREIGN PATENT DOCUMENTS

| | | | |
|---|---|---|---|
| EP | 3048488 | A1 | 7/2016 |
| EP | 3819711 | A1 | 5/2021 |
| EP | 4123382 | A1 | 1/2023 |
| JP | 2019167169 | A | 10/2019 |
| JP | 2022171206 | A | 11/2022 |

* cited by examiner

*Primary Examiner* — David H Banh
(74) *Attorney, Agent, or Firm* — Canon U.S.A., Inc. IP Division

(57) ABSTRACT

A charge eliminating apparatus configured to remove charges from a sheet on which an image is formed by a printing apparatus, includes a charge eliminating roller pair including a first charge eliminating roller and a second charge eliminating roller configured to form a nip portion together with the first charge eliminating roller, the charge eliminating roller pair being configured to remove the charges from the sheet in a state of contacting the sheet at the nip portion, a first setting unit configured to set a value of a voltage applied to the charge eliminating roller pair, and a second setting unit configured to set whether to apply the voltage to the charge eliminating roller pair, wherein the second setting unit is configured to set whether to apply the voltage to the charge eliminating roller pair without changing the value of the voltage set by the first setting unit.

20 Claims, 14 Drawing Sheets

FIG.7

| MODE LEVER 141 | DIAL 142 | CONTACT TYPE CHARGE ELIMINATING UNIT 129 | NON-CONTACT TYPE CHARGE ELIMINATING UNIT 131 |
|---|---|---|---|
| ON | 0 | OFF | ON |
| | 1 – 99 | DIAL VALUE × -100 V | |
| OFF | 0 | OFF | ON |
| | 1 – 99 | | |

FIG.14

| MODE LEVER 141 | DIAL 142 | ODD-NUMBERED SHEET P | EVEN-NUMBERED SHEET P |
|---|---|---|---|
| ON | 0 | OFF | |
| | 1 – 99 | — | DIAL VALUE × -100 V |
| OFF | 0 | OFF | |
| | 1 – 99 | | |

CHARGE ELIMINATING APPARATUS, IMAGE FORMING APPARATUS, AND CHARGE ADJUSTING APPARATUS

BACKGROUND OF THE INVENTION

Field of the Invention

The present invention relates to a charge eliminating apparatus for removing electric charges from a sheet, and an image forming apparatus including the charge eliminating apparatus, and a charge adjusting apparatus.

Description of the Related Art

In an image forming apparatus, such as a copying machine, there may be a case where sheets are electrically charged when images are formed thereon, and the discharged sheets stick to each other due to electrostatic force generated between the discharged sheets, which causes an improper stack. In view of the foregoing, Japanese Patent Application Laid-open No. 2019-167169 discusses an image forming apparatus including a charge eliminating apparatus for removing charges (electric charges) from a sheet. The charge eliminating apparatus discussed in Japanese Patent Application Laid-open No. 2019-167169 includes a contact type charge eliminating device (charge eliminating roller) that removes charges by contacting a conveyed sheet, and a non-contact type charge eliminating device that removes charges without contacting the conveyed sheet. Further, Japanese Patent Application Laid-open No. 2022-171206 discusses a charge adjusting apparatus in which a voltage is applied to every other conveyed sheet to electrically charge surfaces of the sheets so that the surfaces have a same polarity to improve the improper stack when the sheets are stacked.

Since charging characteristics of the sheets are different depending on materials and basis weights thereof, it is desirable that a charge removal voltage be appropriately set depending on a sheet type. Further, depending on the sheet type, some sheets do not need the charge removal with the charge eliminating (charge removal) roller. Accordingly, an operator needs to set an appropriate charge removal voltage every time depending on the type of sheet used for a print job, which raises an issue of a complicate operation when the operator makes settings of the charge eliminating apparatus. Further, similarly, in the charge adjusting apparatus that applies a voltage to every other sheet, since an appropriate voltage has to be set every time depending on the sheet type, there is an issue that an operator has to perform a complicate operation to set the charge adjusting apparatus.

SUMMARY OF THE INVENTION

The present invention is directed to a charge eliminating apparatus, an image forming apparatus, and a charge adjusting apparatus for improving an operation performed when a setting relating to a sheet electric charge removal or a sheet electric charge adjustment is performed.

According to an aspect of the present invention, a charge eliminating apparatus configured to remove charges from a sheet on which an image is formed by a printing apparatus, includes a charge eliminating roller pair including a first charge eliminating roller and a second charge eliminating roller configured to form a nip portion together with the first charge eliminating roller, the charge eliminating roller pair being configured to remove the charges from the sheet in a state of contacting the sheet at the nip portion, a first setting unit configured to set a value of a voltage applied to the charge eliminating roller pair, and a second setting unit configured to set whether to apply the voltage to the charge eliminating roller pair, wherein the second setting unit is configured to set whether to apply the voltage to the charge eliminating roller pair without changing the value of the voltage set by the first setting unit.

According to another aspect of the present invention, a charge adjusting apparatus configured to adjust charges on a sheet on which an image is formed by a printing apparatus, includes a bias application roller pair configured to provide charges opposite in polarity to a surface potential of the sheet on which the image is formed, so that the surface potential of the sheet on which the image is formed is reversed, a first setting unit configured to set a value of a voltage to be applied to the bias application roller pair, and a second setting unit configured to set whether to apply the voltage to the bias application roller pair, wherein the second setting unit is configured to set whether to apply the voltage to the bias application roller pair without changing the value of the voltage set by the first setting unit.

Further features of the present invention will become apparent from the following description of embodiments with reference to the attached drawings.

BRIEF DESCRIPTION OF THE DRAWINGS

FIG. 7 is a table illustrating relationships respectively between settings of the operation unit and operations performed by the charge eliminating apparatus.

FIG. 14 is a table illustrating relationships respectively between settings of an operation unit and operations performed by a charge adjusting apparatus according to the other embodiment.

DESCRIPTION OF THE EMBODIMENTS

Hereinbelow, embodiments of the present disclosure will be described with reference to the attached drawings. Dimensions, materials, shapes of components, and their relative arrangements described in the following embodiments are not intended to limit the range of the present technique to the embodiments unless otherwise specifically described.

Configuration of Image Forming System

Figure 1:
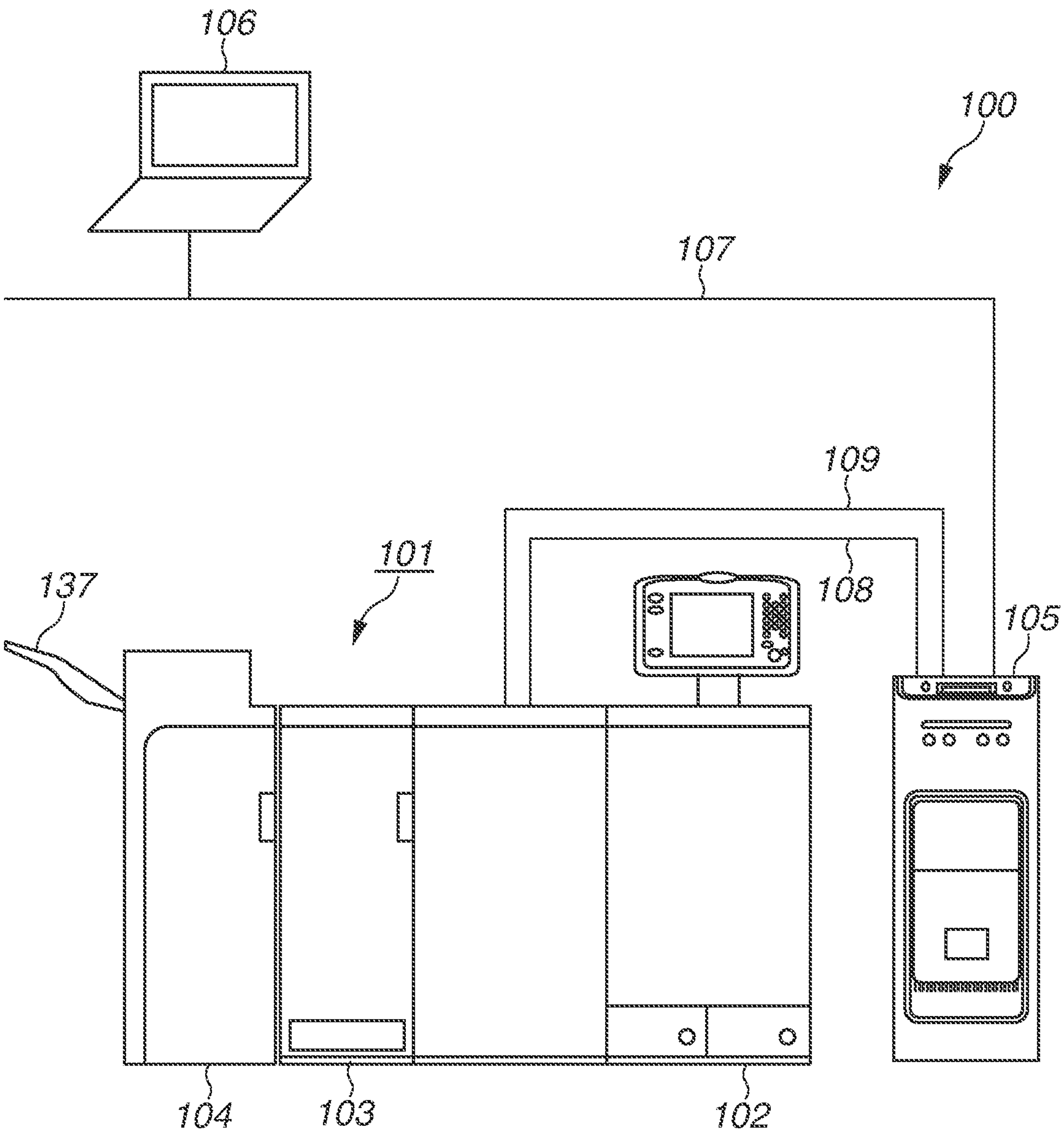
FIG. 1 is a diagram illustrating an entire image forming system.

FIG. 1 is a diagram illustrating a configuration of an image forming system 100 including an image forming apparatus 101 according to an embodiment. The image forming system 100 includes the image forming apparatus 101 and an external controller 105. The image forming apparatus 101 and the external controller 105 are communicably connected via an internal local area network (LAN) 108 and a video cable 109. The external controller 105 is connected to a client personal computer (PC) 106 via an external LAN 107. The external controller 105 acquires a print instruction (print job) from the client PC 106.

A printer driver having a function of converting an image into a page description language processable by the external controller 105 is installed in the client PC 106. A user can issue an instruction for printing using various kinds of applications via the printer driver. The printer driver transmits a print job including image data to the external controller 105 based on a print instruction from the user. The external controller 105 receives the print job from the client PC 106, performs data analysis processing and rasterizing processing on the image data included in the print job, and instructs the image forming apparatus 101 to perform printing (image forming) based on the image data.

The image forming apparatus 101 includes a printing apparatus 102, a charge eliminating apparatus 103, and a finisher 104. The printing apparatus 102 forms an image on a sheet based on an instruction from the external controller 105. The charge eliminating apparatus 103, disposed downstream of the printing apparatus 102, removes charges (electric charges) from the sheet with the image formed thereon by the printing apparatus 102. The finisher 104, disposed downstream of the charge eliminating apparatus 103, stacks, on a stack tray 137, the sheet with the image formed thereon by the printing apparatus 102.

The image forming system 100 has a configuration in which the external controller 105 is connected to the image forming apparatus 101, but the external controller 105 is not always necessary. For example, the image forming apparatus 101 may be configured to acquire the print job including the image data directly from the client PC 106 via the external LAN 107. In this case, the image forming apparatus 101 is to perform the data analysis processing and the rasterizing processing performed by the external controller 105. In other words, the image forming apparatus 101 and the external controller 105 may be integrally configured.

System Configuration of Image Forming Apparatus

Figure 2:
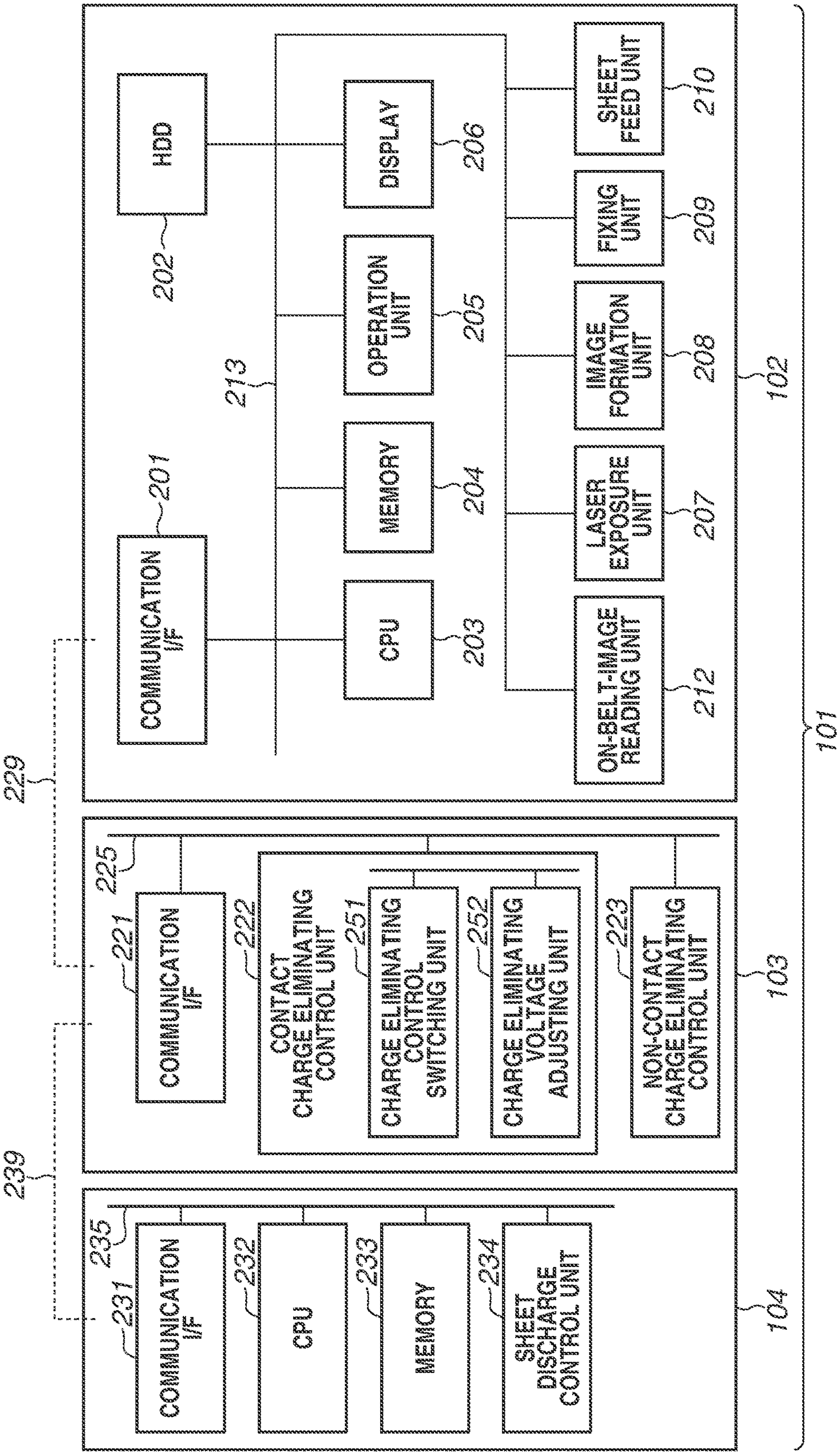
FIG. 2 is a block diagram illustrating a system configuration of an image forming apparatus.

FIG. 2 is a block diagram illustrating a system configuration of the image forming apparatus 101. First, a configuration of the printing apparatus 102 of the image forming apparatus 101 will be described. The printing apparatus 102 includes a communication interface (I/F) 201 to communicate with other apparatuses. The printing apparatus 102 also includes a hard disk drive (HDD) 202, a central processing unit (CPU) 203, a memory 204, and an on-belt-image reading unit 212, to control operation of the printing apparatus 102. The printing apparatus 102 also includes a laser exposure unit 207, an image formation unit 208, a fixing unit 209, and a sheet feed unit 210, to form an image. The printing apparatus 102 also includes an operation unit 205 and a display 206 as user interfaces. These components are communicably connected with each other via a system bus 213.

The communication I/F 201 is connected to the charge eliminating apparatus 103 via a communication cable 229 and controls communications between the printing apparatus 102 and the charge eliminating apparatus 103. In a case where the printing apparatus 102 and the charge eliminating apparatus 103 operate in conjunction with each other, information and data are transmitted and received via the communication I/F 201.

The CPU 203 performs image processing and image forming processing (print control) in a comprehensive manner by executing a computer program stored in the HDD 202. The memory 204 provides a work area for the CPU 203 to execute various kinds of processing. In a case where the image forming processing is performed, the CPU 203 controls the laser exposure unit 207, the image formation unit 208, the fixing unit 209, and the sheet feed unit 210.

The laser exposure unit 207 includes a photosensitive member, a charging wire for charging the photosensitive member, and a light source for exposing the photosensitive member to light to form an electrostatic latent image on the photosensitive member. The photosensitive member is, for example, a photosensitive belt in which a photoconductive layer is formed on a belt-shaped elastic member, or a photosensitive drum in which a photoconductive layer is formed on a surface of a cylinder. Further, instead of the charging wire, a charging roller may be used. The laser exposure unit 207 charges the surface of the photosensitive member to a uniform negative potential by the charging wire. The laser exposure unit 207 emits a laser beam from the light source based on the image data. The laser beam scans the uniformly charged surface of the photosensitive member. In this way, the potential at a position of the photosensitive member irradiated with the laser beam changes, and an electrostatic latent image is formed on the surface thereof. In practice, the printing apparatus 102 includes four photosensitive members corresponding to four colors of yellow (Y), magenta (M), cyan (C), and black (K). Four different electrostatic latent images corresponding to the different colors are formed on the four photosensitive members, respectively.

The image formation unit 208 transfers a toner image formed on the photosensitive member to a sheet. The image formation unit 208 includes a development unit, a transfer unit, and a toner supply unit. The development unit causes negatively charged toner to be attached from a developing cylinder to the electrostatic latent image formed on the surface of the photosensitive member, to form a toner image. In practice, the printing apparatus 102 includes four development units corresponding to four colors of yellow (Y), magenta (M), cyan (C), and black (K). Each of the development units visualizes the electrostatic latent image on the photosensitive member using a corresponding color. The toner supply unit replenishes the development unit with toner when a toner amount in the development unit runs short due to formation of toner images.

The transfer unit includes an intermediate transfer belt, and the toner images are transferred from the respective photosensitive members to the intermediate transfer belt. Primary transfer rollers are disposed opposing the respective photosensitive members across the intermediate transfer belt. By a positive potential being applied to each of the primary transfer rollers, the toner images are transferred respectively from the four photosensitive members to the intermediate transfer belt in an overlapped manner. In this way, a full color toner image is formed on the intermediate transfer belt. The toner image formed on the intermediate transfer belt is transferred to a sheet by a secondary transfer roller described below. The secondary transfer roller transfers the full color toner image from the intermediate transfer belt to the sheet by being applied with a positive potential.

The fixing unit 209 fixes the transferred toner image to the sheet. The fixing unit 209 includes a heater and a roller pair. The fixing unit 209 heats and presses the toner image on the sheet by the heater and the roller pair to melt and fix the toner image to the sheet. In this way, an image is formed on the sheet. The sheet feed unit 210 includes conveyance rollers and various sensors on a conveyance path to control a sheet feeding operation.

The on-belt-image reading unit 212 reads an image formed on the intermediate transfer belt of the transfer unit based on an instruction from the CPU 203. For example, when an image formation condition is adjusted, the CPU 203 reads an adjustment image formed on the intermediate transfer belt for adjusting the image formation condition using the on-belt-image reading unit 212. The operation unit 205 is an input device for receiving an input of various settings or an operation instruction from the user. The operation unit 205 is, for example, various input keys or a touch panel. The display 206 serving as a display unit is an output device for displaying setting information of the image forming apparatus 101 or a processing status (status information) of the print job.

Next, a configuration of the charge eliminating apparatus 103 will be described. The charge eliminating apparatus 103 includes a communication I/F 221, a contact charge eliminating control unit 222, and a non-contact charge eliminating control unit 223. These components are connected with each other via a system bus 225.

The communication I/F 221 is connected to the printing apparatus 102 via the communication cable 229 and controls communications between the printing apparatus 102 and the charge eliminating apparatus 103. Further, the communication I/F 221 is connected to the finisher 104 via a communication cable 239 and controls communications between the charge eliminating apparatus 103 and the finisher 104.

The contact charge eliminating control unit 222 and the non-contact charge eliminating control unit 223 each perform various kinds of controls based on control instructions received from the CPU 203 via the communication cable 229. The contact charge eliminating control unit 222 includes a charge eliminating control switching unit 251 and a charge eliminating voltage adjusting unit 252 and controls the charge eliminating voltage of a contact type charge eliminating unit 129 (described below). The charge eliminating control switching unit 251 obtains a state of a mode lever 141 (described below) and switches the contact type charge eliminating unit 129 on and off based on the state of the mode lever 141. The charge eliminating voltage adjusting unit 252 acquires a setting value set with a dial 142 (described below) and controls a magnitude of voltage (voltage value and high voltage value) to be applied to the contact type charge eliminating unit 129 based on the setting value. The non-contact charge eliminating control unit 223 controls charge eliminating by a non-contact type charge eliminating unit 131 (described below). In the present embodiment, the charge eliminating apparatus 103 operates based on the control instructions from the CPU 203 mounted on the image forming apparatus 101, but the operation of the charge eliminating apparatus 103 is not limited thereto, and the control instructions may be provided by, for example, a CPU mounted on the charge eliminating apparatus 103.

Next, a configuration of the finisher 104 will be described. The finisher 104 includes a communication I/F 231, a CPU 232, a memory 233, and a sheet discharge control unit 234. These components are connected with each other via a system bus 235.

The communication I/F 231 is connected to the charge eliminating apparatus 103 via the communication cable 239 and controls communications between the charge eliminating apparatus 103 and the finisher 104. The CPU 232 performs various kinds of controls required for discharging the sheet based on a control program stored in the memory 233. The memory 233 is a storage device storing the control program. The sheet discharge control unit 234 performs control to discharge the conveyed sheet to the stack tray 137 based on an instruction from the CPU 232.

Configuration of Image Forming Apparatus

Figure 3:
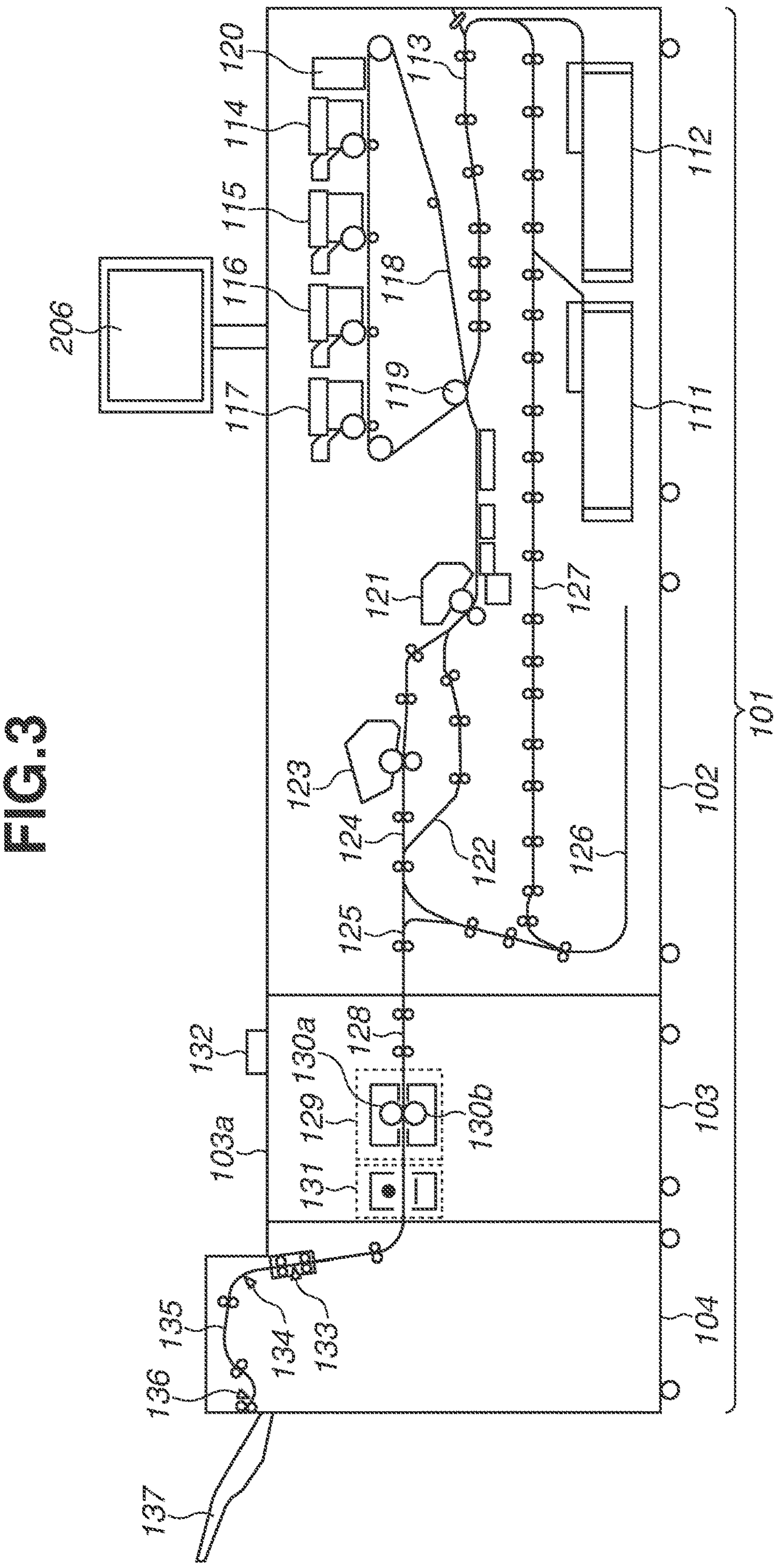
FIG. 3 is a cross-section diagram of the image forming apparatus.

FIG. 3 is a cross-section diagram of the image forming apparatus 101. The display 206 is provided on an upper portion of a housing of the printing apparatus 102. The display 206 displays information about a printing status and information for settings of the image forming apparatus 101.

The printing apparatus 102 includes sheet feed decks 111 and 112, conveyance paths 113, 122, 124, and 125, a reversing conveyance path 126, a two-sided conveyance path 127, and various rollers. The sheet feed decks 111 and 112, which are the sheet feed unit 210, can store different types of sheets. A topmost sheet of the sheets stored in the sheet feed deck 111 or 112 is separated and fed to the conveyance path 113. The printing apparatus 102 includes, as the laser exposure unit 207, image forming units 114, 115, 116, and 117 each for forming an image, and forms a color image on the sheet. The image forming unit 114 forms an image (toner image) of black (K). The image forming unit 115 forms an image of cyan (C). The image forming unit 116 forms an image of magenta (M). The image forming unit 117 forms an image of yellow (Y).

The printing apparatus 102 includes, as the image formation unit 208, an intermediate transfer belt 118 to which a toner image is transferred from each of the image forming units 114, 115, 116, and 117, and a secondary transfer roller 119.

The intermediate transfer belt 118 rotates clockwise in FIG. 3, and toner images are transferred (primarily transferred) thereto in an overlapped manner in order of the image forming units 117, 116, 115, and 114. In this way, a full color toner image is formed on the intermediate transfer belt 118. The intermediate transfer belt 118 rotates to convey the toner image to the secondary transfer roller 119. A sheet is conveyed on the conveyance path 113 in synchronization with a timing at which the toner image is conveyed to the secondary transfer roller 119. The secondary transfer roller 119 transfers (secondarily transfers) the toner image on the intermediate transfer belt 118 to the conveyed sheet.

An on-belt-image reading sensor 120 serving as the on-belt-image reading unit 212 is provided near the intermediate transfer belt 118. The on-belt-image reading sensor 120 is located downstream of the image forming units 114, 115, 116, and 117 in a rotation direction of the intermediate transfer belt 118. The on-belt-image reading sensor 120 reads the image transferred to the intermediate transfer belt 118 from the image forming units 114, 115, 116, and 117. The on-belt-image reading sensor 120 is, for example, an optical sensor that emits light to the image on the intermediate transfer belt 118 and receives the reflected light to read the image. For example, the on-belt-image reading sensor 120 reads an adjustment image formed on the intermediate transfer belt 118 for adjusting an image formation condition. The CPU 203 analyzes a read result of the adjustment image read by the on-belt-image reading sensor 120, and feeds back the analyzed read result to the image formation condition to perform calibration.

The printing apparatus 102 includes a first fixing unit 121 and a second fixing unit 123 as the fixing unit 209. The first fixing unit 121 and the second fixing unit 123 have a same configuration and fix a toner image on a sheet. Thus, each of the first fixing unit 121 and the second fixing unit 123 includes a pressure roller and a heating roller. The toner image is heated and pressed to be melted and pressure-fixed on the sheet by passing through between the pressure roller and the heating roller. The sheet that has passed through the second fixing unit 123 is conveyed to the conveyance path 124. The second fixing unit 123 is disposed downstream of the first fixing unit 121 in a sheet conveyance direction and used to add gloss to the image on the sheet that has been subjected to fixing processing by the first fixing unit 121, or to secure fixability. For this reason, the second fixing unit 123 may not be used depending on the type of sheet and the content of the print job. The conveyance path 122 is provided to convey the sheet that has been subjected to the fixing processing by the first fixing unit 121 thereon without passing the sheet via the second fixing unit 123.

The conveyance path 125 and the reversing conveyance path 126 are disposed at positions after the conveyance paths 124 and 122 join together. In a case where an instruction for two-sided printing is issued, the sheet is conveyed to the reversing conveyance path 126. The conveyance direction of the sheet conveyed to the reversing conveyance path 126 is reversed in the reversing conveyance path 126 and conveyed to the two-sided conveyance path 127. The surface (first surface) of the sheet on which an image is formed is reversed by the reversing conveyance path 126 and the two-sided conveyance path 127. The sheet is conveyed again to the conveyance path 113 via the two-sided conveyance path 127, and an image is formed on a second surface by passing the secondary transfer roller 119. In a case of one-sided printing, or in a case where images have been formed on both sides in the two-sided printing, the sheet is conveyed to the charge eliminating apparatus 103 via the conveyance path 125.

The charge eliminating apparatus 103 includes a conveyance path 128, the contact type charge eliminating unit 129, the non-contact type charge eliminating unit 131, and a plurality of rollers that receives a sheet from the printing apparatus 102 and conveys the received sheet. The secondary transfer roller 119 in the present embodiment applies a negative voltage to the sheet, so that the upper surface of the sheet is negatively charged and the lower surface of the sheet is positively charged due to the induced polarization. For this reason, when sheets are stacked on the stack tray 137 without being subjected to charge eliminating processing, there is a possibility of the stacked sheets sticking to each other due to electrostatic force. To prevent the sticking of the sheets due to the electrostatic force, the charge eliminating apparatus 103 in the present embodiment removes electric charges from the surface of the sheet by the contact type charge eliminating unit 129 and the non-contact type charge eliminating unit 131.

The contact type charge eliminating unit 129 (contact charge eliminating unit) includes a charge eliminating roller pair of a charge eliminating roller 130*a* and a charge eliminating roller 130*b*, and removes charges from the sheet in a state of contacting the sheet (contact state) at a nip portion between the two charge eliminating rollers 130*a* and 130*b*. The charge eliminating roller 130*b* is an example of a first charge eliminating roller, and the charge eliminating roller 130*a* is an example of a second charge eliminating roller.

The non-contact type charge eliminating unit 131 (non-contact charge eliminating unit) provided downstream of the contact type charge eliminating unit 129 removes electric charges from the conveyed sheet in a state of not contacting the sheet (non-contact state). Further, an operation unit 132 for an operator to switch the contact type charge eliminating unit 129 on and off or make a setting regarding a voltage value (charge eliminating voltage) of the contact type charge eliminating unit 129 is provided on a top surface 103*a* that constitutes an apparatus top surface of the housing of the charge eliminating apparatus 103.

The sheet conveyed from the printing apparatus 102 to the charge eliminating apparatus 103 passes through the conveyance path 128 and is subjected to the charge eliminating processing by the contact type charge eliminating unit 129 and the non-contact type charge eliminating unit 131. Then, the sheet having been subjected to the charge eliminating processing is conveyed to the finisher 104.

The finisher 104 stacks the sheet transferred from the printing apparatus 102. The finisher 104 includes a conveyance path 135 and the stack tray 137 for stacking sheets. The conveyance path 135 is provided with conveyance sensors 133, 134, and 136. The sheet conveyed from the printing apparatus 102 is discharged to the stack tray 137 via the conveyance path 135. The conveyance sensors 133, 134, and 136 detect passing of the sheet conveyed on the conveyance path 135.

The CPU 232 determines that a conveyance jam (conveyance failure) has occurred in the finisher 104 in a case where the conveyance sensor 133, 134, or 136 does not detect the leading edge or the trailing edge in the conveyance direction of the sheet after a predetermined time has elapsed since the start of the sheet conveyance. In this case, the CPU 232 notifies the printing apparatus 102 that a conveyance jam has occurred.

Configuration of Contact Type Charge Eliminating Unit

Figure 4:
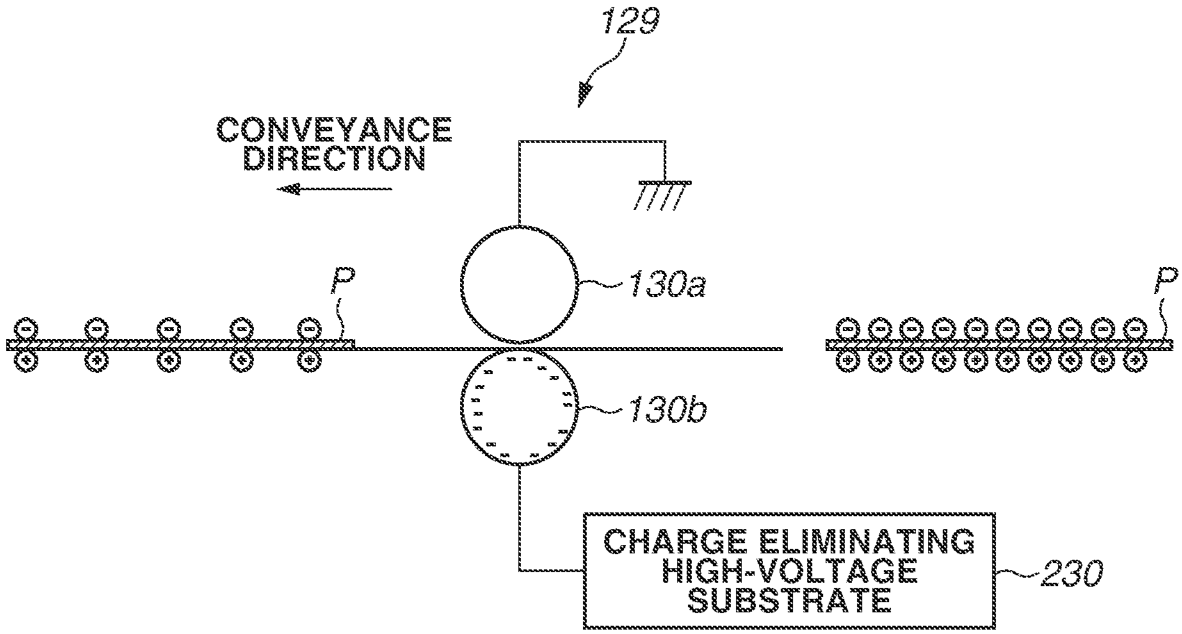
FIG. 4 is a cross-section diagram of a contact type charge eliminating unit.

FIG. 4 is a cross-section diagram illustrating a configuration of the contact type charge eliminating unit 129. As described above, the contact type charge eliminating unit 129 includes the two charge eliminating rollers 130*a* and 130*b* serving as the charge eliminating roller pair that contacts a sheet P. The charge eliminating roller 130*a* is electrically grounded (connected to the ground). Further, the contact type charge eliminating unit 129 is provided with a charge eliminating high-voltage substrate 230. The contact charge eliminating control unit 222 applies a voltage to the charge eliminating roller pair to remove charges from the sheet using the charge eliminating high-voltage substrate 230. More specifically, the contact charge eliminating control unit 222 applies a negative voltage to the charge eliminating roller 130*b* to remove positive charges existing on the lower surface of the sheet P, using the charge eliminating high-voltage substrate 230. Then, when the positive charges existing on the lower surface of the sheet P are reduced, negative charges existing on the upper surface of the sheet P are also reduced via the charge eliminating roller 130*a*. In other words, to remove charges means to reduce charges existing on the sheet P. The contact type charge eliminating unit 129 in the present embodiment is high in charge eliminating effect because the contact type charge eliminating unit 129 contacts the sheet P to apply the voltage directly. On the other hand, the contact type charge eliminating unit 129 has a characteristic in that unevenness of the surface potential of the sheet P with the charges removed therefrom is large and the charge eliminating tends to become uneven.

In the present embodiment, the charge eliminating high-voltage substrate 230 applies a negative voltage to the charge eliminating roller 130*b*. Accordingly, in the case of one-sided printing, the sheet needs to be conveyed in a state where the image-formed surface of the sheet is the upper surface. Thus, in a case where the charge eliminating processing by the contact type charge eliminating unit 129 is to be performed in the job, the display 206 displays a notification prompting the user to make a face-up sheet discharge setting. However, the arrangement of the charge eliminating high-voltage substrate 230 is not limited thereto. The negative charges existing on the upper surface of the sheet P may be removed by electrically grounding the charge eliminating roller 130*b* (connecting the charge eliminating roller 130*b* to the ground), and the charge eliminating high-voltage substrate 230 applying a positive voltage to the charge eliminating roller 130*a*. In addition, two charge eliminating high-voltage substrates may be respectively connected to the charge eliminating rollers 130*a* and 130*b*.

Configuration of Non-Contact Type Charge Eliminating Unit

Figure 5A:
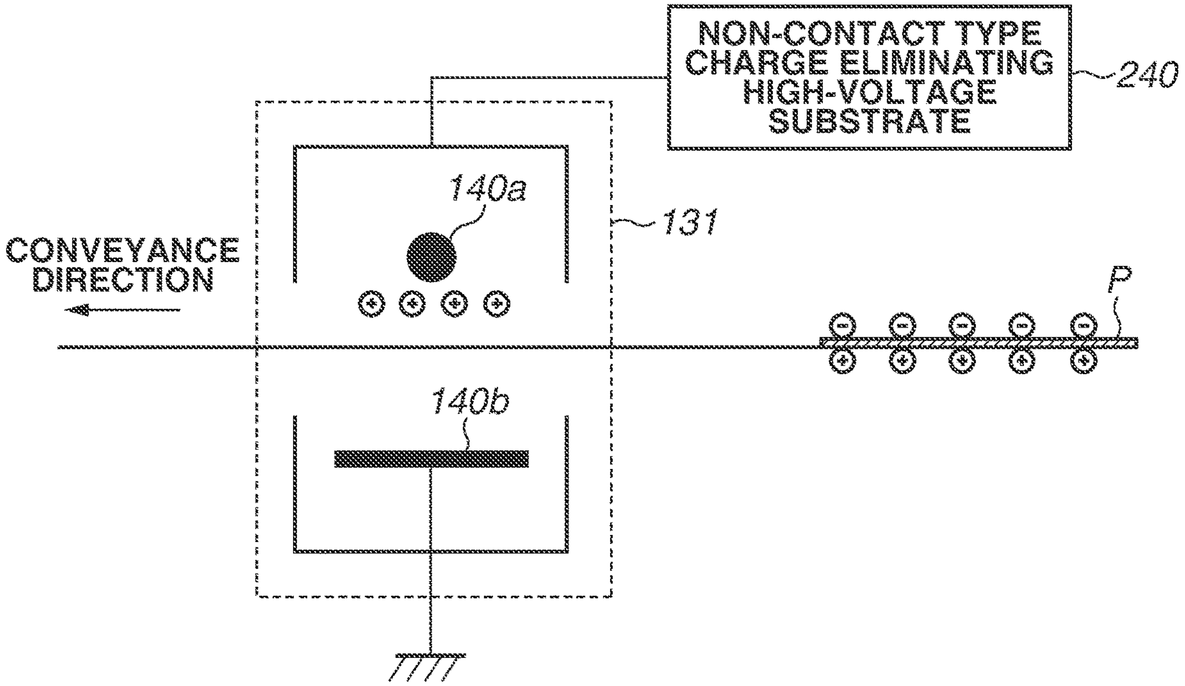
FIGS. 5A and 5B are cross-section diagrams of a non-contact type charge eliminating unit.
Figure 5B:
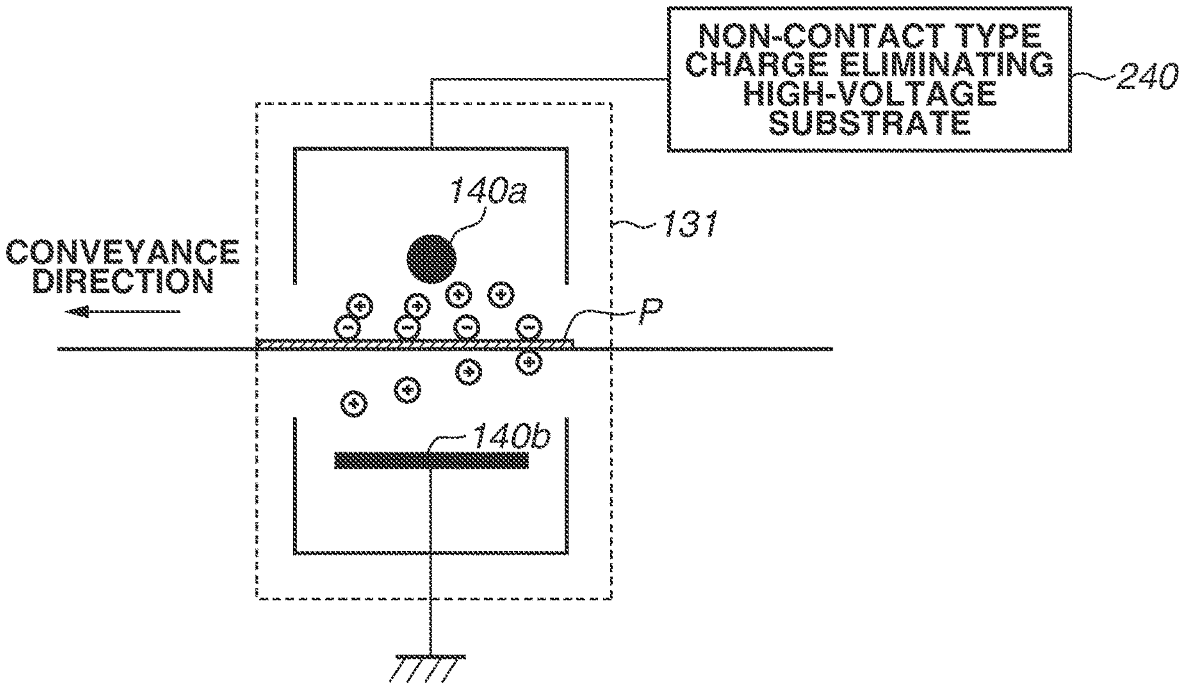

FIGS. 5A and 5B are cross-section diagrams illustrating a configuration of the non-contact type charge eliminating unit 131. The non-contact type charge eliminating unit 131 in the present embodiment can make even the surface potential of the sheet P that has become uneven caused by the charge eliminating processing performed by the above-described contact type charge eliminating unit 129. The non-contact type charge eliminating unit 131 includes a discharging wire 140*a* and a ground electrode 140*b*. The ground electrode 140*b* is electrically grounded (connected to the ground). Further, the non-contact type charge eliminating unit 131 is provided with a non-contact type charge eliminating high-voltage substrate 240. The non-contact charge eliminating control unit 223 applies a positive voltage to the discharging wire 140*a* using the non-contact type charge eliminating high-voltage substrate 240.

As illustrated in FIG. 5A, when the positive voltage is applied to the discharging wire 140*a*, positive charges are generated due to corona discharge. Then, as illustrated in FIG. 5B, the positive charges generated by the discharging wire 140*a* neutralize the negative charges on the upper surface of the sheet P. Further, the positive charges on the lower surface of the sheet P are drawn near the ground electrode 140*b* that is at zero potential.

With the above-described action, the non-contact type charge eliminating unit 131 removes charges from the sheet P. The charge eliminating effect for the sheet P by the non-contact type charge eliminating unit 131 according to the present embodiment is smaller than that by the contact type charge eliminating unit 129, but the unevenness of the surface potential of the sheet P after the charge eliminating processing is smaller. For this reason, the non-contact type charge eliminating unit 131 can improve the surface potential state of the sheet P that has become uneven by the contact type charge eliminating unit 129. In the present embodiment, an alternating-current (AC) corotron charger is employed as the non-contact type charge eliminating unit 131, but it is not limited thereto. For example, an ionizer including a charge eliminating needle that emits ions to the sheet may be used as the non-contact type charge eliminating unit 131. Further, in the present embodiment, the discharging wire 140*a* is arranged only on the upper surface side of the sheet in the non-contact type charge eliminating unit 131, but it is not limited thereto. For example, the non-contact type charge eliminating unit 131 may have a configuration in which discharging wires or ionizers are arranged on both the upper surface side and the lower surface side of the conveyance path 128.

Configuration of Operation Unit of Charge Eliminating Apparatus

The charge eliminating apparatus 103 in the present embodiment includes two charge eliminating units of the contact type charge eliminating unit 129 and the non-contact type charge eliminating unit 131 to remove charges from the sheet. However, the charge eliminating apparatus 103 can remove charges from the sheet using only one of the contact type charge eliminating unit 129 and the non-contact type charge eliminating unit 131. For example, charges of a sheet with a small electric resistance, such as plain paper, can be sufficiently removed using only the non-contact type charge eliminating unit 131 without using the contact type charge eliminating unit 129. On the other hand, charges of a sheet with a large electric resistance, such as synthetic paper, are desirably removed by both the contact type charge eliminating unit 129 and the non-contact type charge eliminating unit 131. Thus, an operator can optionally change settings of the charge eliminating apparatus 103 using the operation unit 132 depending on the type of sheet to be printed in the job.

Figure 6:
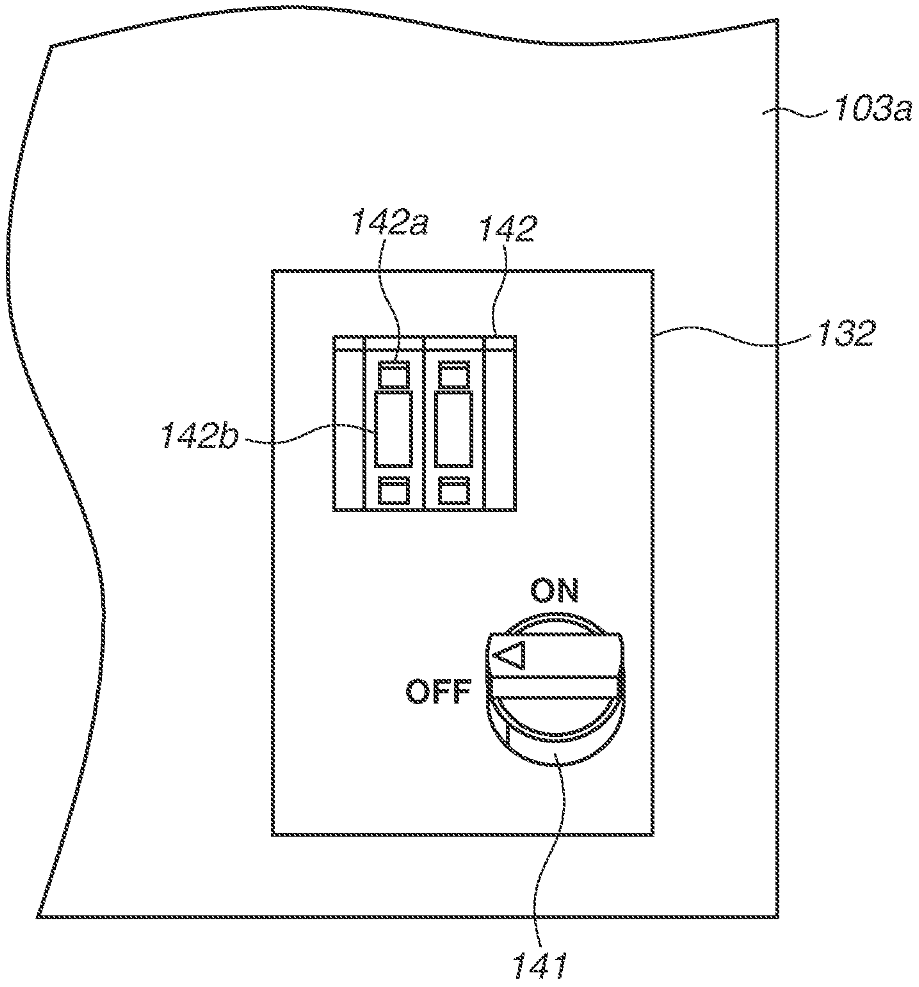
FIG. 6 is a top view of an operation unit of a charge eliminating apparatus.

FIG. 6 is a top view illustrating the operation unit 132 of the charge eliminating apparatus 103. The charge eliminating apparatus 103 is provided with the operation unit 132 for setting the operation of the contact type charge eliminating unit 129. The operation unit 132 is arranged on the top surface 103*a* (apparatus top surface) of the housing of the charge eliminating apparatus 103. The operation unit 132 includes the mode lever 141 and the dial 142.

The mode lever 141 is a selector switch for manually switching on and off (enabled and disabled) of a voltage application to the charge eliminating roller 130*b* by the charge eliminating high-voltage substrate 230. More specifically, the mode lever 141 is a setting unit for switching between a first mode that enables the contact type charge eliminating unit 129 and a second mode that disables the contact type charge eliminating unit 129. In addition, in the present embodiment, the state in which the contact type charge eliminating unit 129 is on (enabled) is a state in which a voltage is applied to the charge eliminating roller 130*b*, and the state in which the contact type charge eliminating unit 129 is off (disabled) is a state in which a voltage is not applied to the charge eliminating roller 130*b*. FIG. 6 illustrates a state in which the mode lever 141 is set to off, and an operator can switch the mode lever 141 to an on state by turning the mode lever 141 clockwise in FIG. 6.

The dial 142 is a thumb rotary switch for manually setting a voltage value to be applied to the charge eliminating roller 130*b* by the charge eliminating high-voltage substrate 230. The dial 142 includes a button 142*a* and a display portion 142*b*, and the number displayed in the display portion 142*b* is changed by an operator pressing the button 142*a*. In the descriptions below, the setting value set by the dial 142 and displayed on the display portion 142*b* will be sometimes referred to as a dial value. The dial 142 in the present embodiment can set the dial value from 0 to 99. The contact charge eliminating control unit 222 applies, to the charge eliminating roller 130*b*, a voltage at a voltage level corresponding to the setting value (dial value) of the dial 142.

In the present embodiment, the operation unit 132 includes two manual setting units of the dial 142 serving as a first setting unit and the mode lever 141 serving as a second setting unit. Thus, an operator can change the setting of the mode lever 141 without changing the setting of the dial 142. In other words, when the operator switches the contact type charge eliminating unit 129 from on to off using the mode lever 141, the setting value of the dial 142 is not changed.

Operation of Charge Eliminating Apparatus

FIG. 7 is a table illustrating relationships respectively between settings of the mode lever 141 and the dial 142, and the operations performed by the contact type charge eliminating unit 129 and the non-contact type charge eliminating unit 131. As illustrated in FIG. 7, when the mode lever 141 is in an on state, a voltage of the dial value x−100 V is applied to the contact type charge eliminating unit 129. However, even when the mode lever 141 is in an on state, if the dial value is 0, the contact type charge eliminating unit 129 becomes off (no voltage is applied). Then, when the mode lever 141 is in an off state, the contact type charge eliminating unit 129 becomes off (no voltage applied) regardless of the dial value. On the other hand, the non-contact type charge eliminating unit 131 is always in an on state regardless of the settings of the mode lever 141 and the dial 142 of the operation unit 132. In other words, even when the mode lever 141 is in the off state, a voltage is applied to the non-contact type charge eliminating unit 131 by the non-contact charge eliminating control unit 223.

Figure 8:
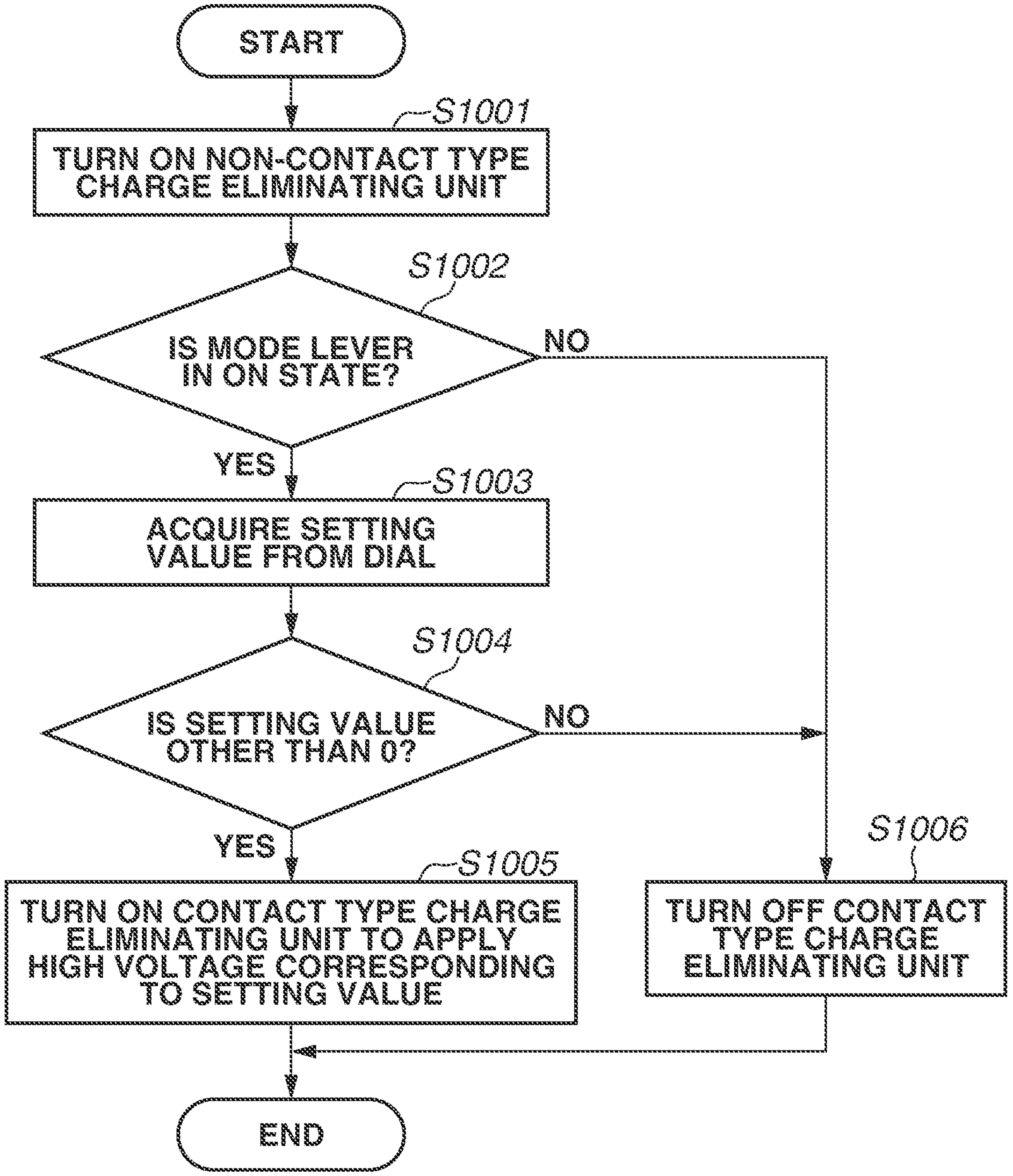
FIG. 8 is a flowchart illustrating an operation performed by the charge eliminating apparatus.

FIG. 8 is a flowchart illustrating an operation performed by the charge eliminating apparatus 103. In the present embodiment, processing of each step illustrated in FIG. 8 is executed by the contact charge eliminating control unit 222 and the non-contact charge eliminating control unit 223 of the charge eliminating apparatus 103. Upon starting a job, in step S1001, the non-contact charge eliminating control unit 223 turns on the non-contact type charge eliminating unit 131. Accordingly, a high voltage is applied to the discharging wire 140*a* from the non-contact type charge eliminating high-voltage substrate 240. Then, in step S1002, the charge eliminating control switching unit 251 of the contact charge eliminating control unit 222 acquires the state of the mode lever 141 and determines whether the mode lever 141 is in an on state or an off state. In a case where the mode lever 141 is in an on state (YES in step S1002), the processing proceeds to step S1003. In step S1003, the charge eliminating voltage adjusting unit 252 of the contact charge eliminating control unit 222 acquires the setting value (dial value) of the dial 142. Then, in step S1004, the contact charge eliminating control unit 222 determines whether the acquired setting value is a value other than 0 (zero). In a case where the setting value is a value other than 0 (YES in step S1004), the processing proceeds to step S1005. In step S1005, the contact charge eliminating control unit 222 applies a high voltage corresponding to the setting value of the dial 142 to the contact type charge eliminating unit 129. On the other hand, in a case where the mode lever 141 is in an off state (NO in step S1002), or the setting value is 0 (NO in step S1004), the processing proceeds to step S1006. In step S1006, the contact charge eliminating control unit 222 turns off the contact type charge eliminating unit 129. Then, the contact charge eliminating control unit 222 and the non-contact charge eliminating control unit 223 end the processing.

In the present embodiment, the setting of the charge eliminating apparatus 103 set by the operation unit 132 before the start of the print job is maintained until the job is completed. More specifically, even in a case where an operator changes the setting value of the dial 142 in the middle of the job, the contact charge eliminating control unit 222 does not change the value of the voltage applied to the contact type charge eliminating unit 129 until the job ends. Then, after the job ends, the contact charge eliminating control unit 222 changes the value of the voltage applied to the contact type charge eliminating unit 129. In this way, even in a case where an operator changes the setting of the charge eliminating apparatus 103 in the middle of the job by mistake, it is possible to remove charges from the sheet during the job.

With the operation unit 132 configured as described above, it is possible to set whether to apply a voltage to the contact type charge eliminating unit 129 by the mode lever 141, without changing the setting value (dial value) of the dial 142. In other words, even in a case where the contact type charge eliminating unit 129 is switched from on to off by the mode lever 141, the setting value (dial value) of the dial 142 is maintained without being changed.

A description is given of a case, for example, where the image forming apparatus 101 executes a first job of performing printing on synthetic paper, a second job of performing printing on plain paper after the first job, and then a third job of performing printing on synthetic paper after the second job. Herein, the synthetic paper is an example of a type of sheet that requires charge removal therefrom by the contact type charge eliminating unit 129, and the plain paper is an example of a type of sheet that does not require charge removal therefrom by the contact type charge eliminating unit 129. In a case where the operation unit 132 of the charge eliminating apparatus 103 has a configuration not including the mode lever 141, an operator needs to start the first job after setting the dial value to an appropriate value, and after the first job is completed, the operator needs to start the second job after setting the dial value to 0. Then, after the second job is completed, the operator needs to set the dial value to an appropriate value by operating the dial 142 again before starting the third job. On the other hand, the operator can start the second job by setting the mode lever 141 to an off state without changing the dial value after the first job, because the operation unit 132 according to the present embodiment has the two manual operation units of the mode lever 141 and the dial 142. Since the dial value is maintained after the second job is completed, the operator can start the third job by only setting the mode lever 141 to an on state. Thus, the charge eliminating rollers 130*a* and 130*b* convey the sheet P even when the mode lever 141 is in an off state.

As described above, since the operation unit 132 according to the present embodiment includes both the mode lever 141 and the dial 142, it is possible to simplify the operation when the operator changes the setting of the charge eliminating apparatus 103. In particular, in the present embodiment, the operator can switch the contact type charge eliminating unit 129 on and off without changing the setting value of the charge eliminating voltage of the contact type charge eliminating unit 129 using the operation unit 132.

In the present embodiment, the operation unit 132 is arranged on the top surface 103*a* of the charge eliminating apparatus 103, but the operation unit 132 may be arranged on a front surface of the housing of the apparatus.

Further, in the present embodiment, a voltage is not applied to the charge eliminating roller 130*b* when the contact type charge eliminating unit 129 is in an off state, but the voltage value applied when the contact type charge eliminating unit 129 is off does not exactly need to be 0. More specifically, a state where a small voltage is applied to the contact type charge eliminating unit 129 can also be said that the contact type charge eliminating unit 129 is disabled because there is almost no charge eliminating effect by the contact type charge eliminating unit 129. In other words, the mode lever 141 may be configured to switch the contact type charge eliminating unit 129 between the "enabled state" and "a (disabled) state where a small voltage is applied". Even with this configuration, the similar effect to that of the present embodiment described above can be obtained.

Figure 9:
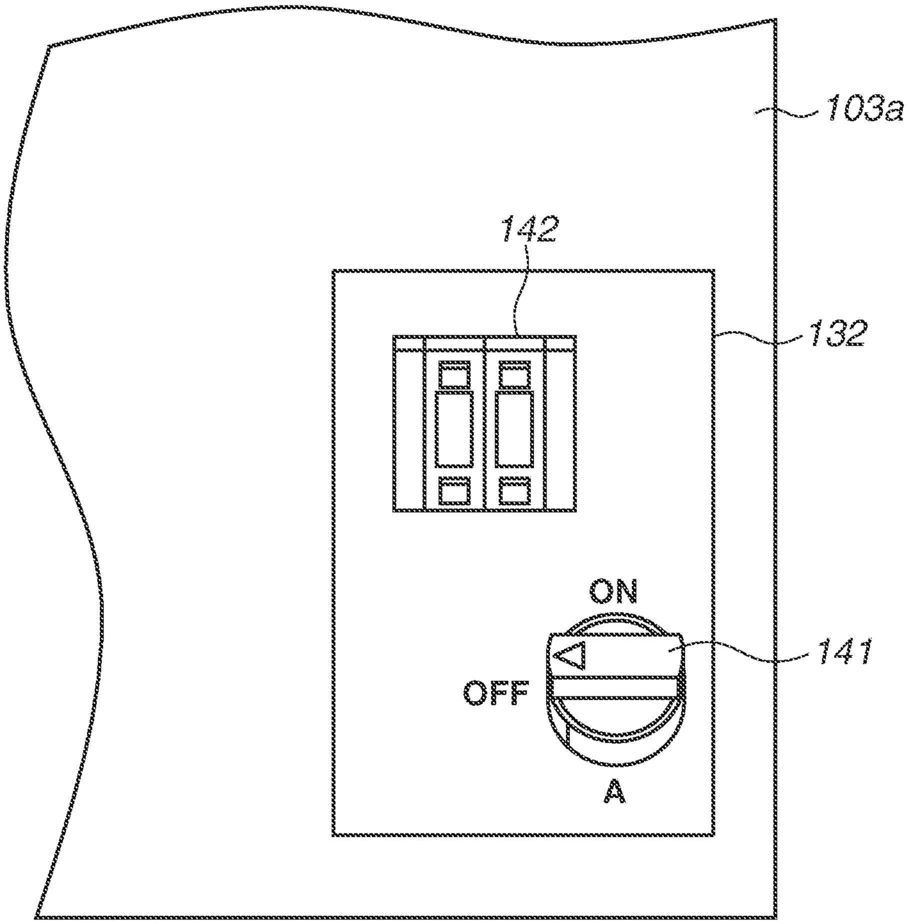
FIG. 9 is a top view illustrating a modification example of the operation unit of the charge eliminating apparatus.

FIG. 9 is another example of the operation unit 132. The mode lever 141 in the above-described embodiment is configured to switch "ON" and "OFF" the voltage application to the charge eliminating roller 130*b* by the charge eliminating high-voltage substrate 230. However, the mode lever 141 may have a different setting other than "ON" and "OFF" (e.g., "A" in FIG. 9). For example, in a case where the mode lever 141 is set to "A", a value of a voltage applied to the charge eliminating roller 130*b* is set to a predetermined value regardless of the setting of the dial 142. With such a configuration, an operator can easily set the contact type charge eliminating unit 129 to a frequently used voltage value, which improves the operability.

Figure 10:
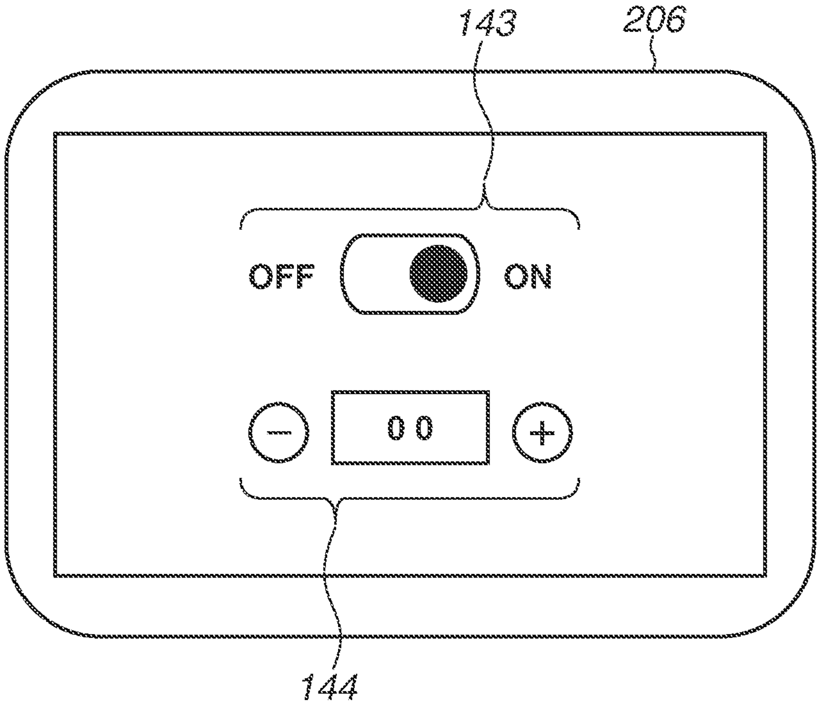
FIG. 10 is a diagram illustrating an example of an operation screen of the charge eliminating apparatus.

Further, the operation unit 132 for changing the setting of the charge eliminating apparatus 103 may be configured as an operation screen displayed on the display 206. FIG. 10 is an example of the operation screen displayed on the display 206. On the operation screen in FIG. 10, a mode setting unit 143 serving as the second setting unit, and a voltage setting unit 144 serving as the first setting unit are displayed. The mode setting unit 143 is, similar to the above-described mode lever 141, a software key for switching on and off the voltage application to the charge eliminating roller 130*b* by the charge eliminating high-voltage substrate 230. The voltage setting unit 144 is, similar to the above-described dial 142, a software key for setting a value of a voltage applied to the charge eliminating roller 130*b* by the charge eliminating high-voltage substrate 230. In this way, even with the configuration in which the mode setting unit 143 and the voltage setting unit 144 are displayed on the display 206, similar to the above-described embodiment, the operation performed by an operator when the operator changes the setting of the charge eliminating apparatus 103 can be simplified.

Figure 11:
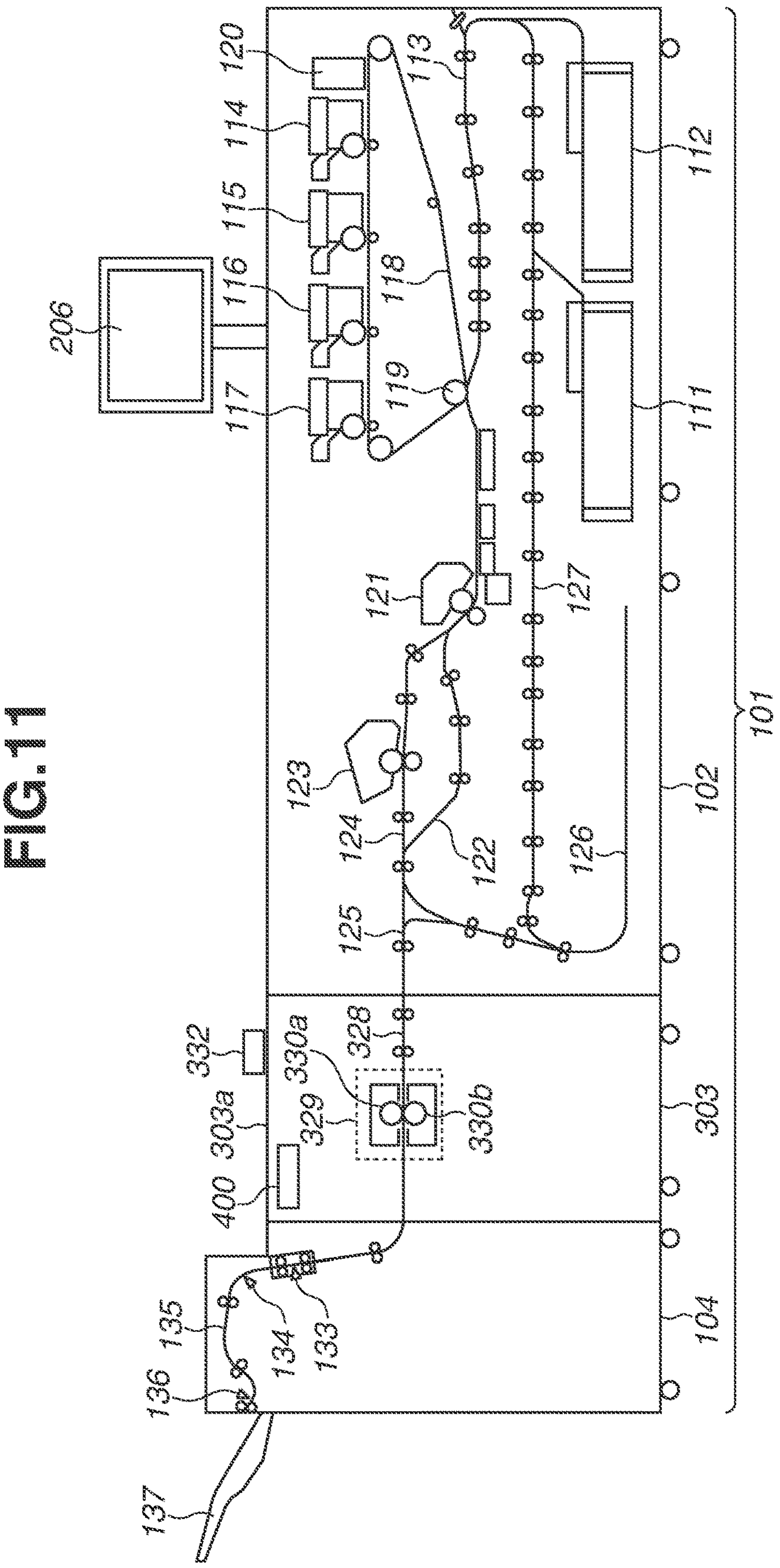
FIG. 11 is a cross-section diagram illustrating an image forming apparatus according to another embodiment.

FIG. 11 illustrates an example of an image forming apparatus 101 of another embodiment. The printing apparatus 102 and the finisher 104 of the image forming apparatus 101 in FIG. 11 are similar to those of the image forming apparatus 101 in FIG. 3, and thus the descriptions thereof are omitted. Hereinbelow, a charge adjusting apparatus 303 will be described. While the charge eliminating apparatus 103 in FIG. 3 includes the contact type charge eliminating unit 129 and the non-contact type charge eliminating unit 131, the charge adjusting apparatus 303 in FIG. 11 includes only a charge adjusting unit 329. More specifically, the charge adjusting apparatus 303 includes a conveyance path 328, the charge adjusting unit 329, an operation unit 332, an applied bias control unit 400, and a plurality of rollers that receives a sheet from the printing apparatus 102 and conveys the received sheet. In other words, the charge adjusting apparatus 303 does not include the non-contact type charge eliminating unit 131. In the present embodiment, the charge adjusting unit 329 uses a contact type roller, but it is not limited thereto. A non-contact type discharging wire or an ionizer may be used instead of using the contact type charge eliminating unit.

Figure 12:
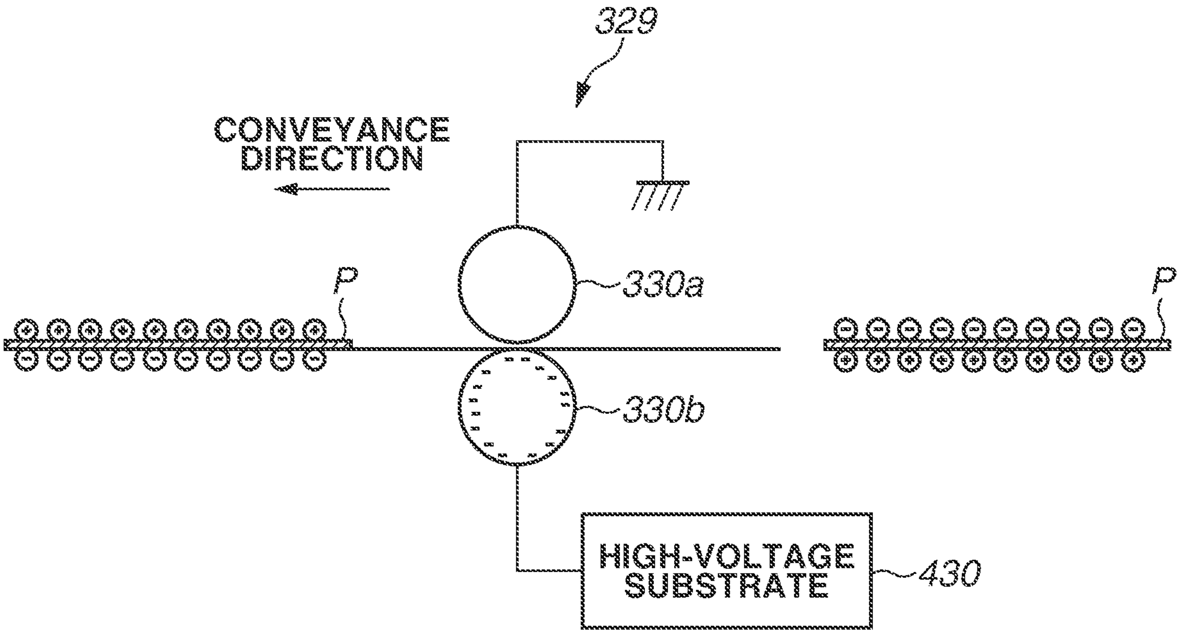
FIG. 12 is a cross-section diagram of a charge adjusting unit.
Figure 13:
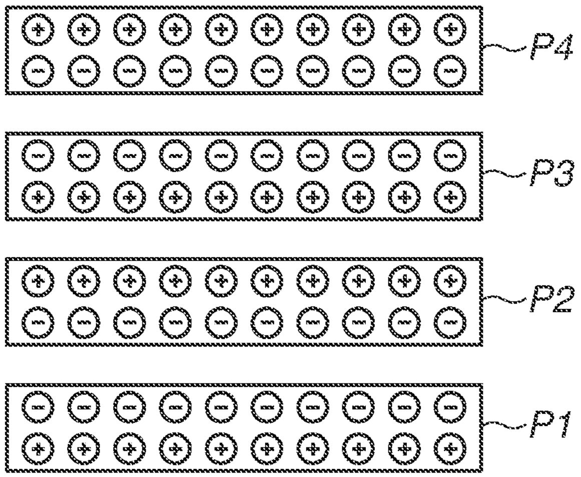
FIG. 13 is a diagram illustrating a state of stacked sheets according to the other embodiment.

FIG. 12 is a cross-section diagram illustrating a configuration of the charge adjusting unit 329 of the image forming apparatus 101 in FIG. 11. The charge adjusting unit 329 includes two bias application rollers 330*a* and 330*b* serving as a bias application roller pair that contacts the sheet P. The bias application roller 330*a* is electrically grounded (connected to the ground). Further, the bias application roller 330*b* is provided with a high-voltage substrate 430. A description is provided of a charge adjustment of the sheet P in a case where the lower surface of the sheet P is positively charged by application of a secondary transfer voltage. When images are consecutively formed on a plurality of sheets, the applied bias control unit 400 performs control so that the high-voltage substrate 430 applies a negative voltage to the bias application roller 330*b* to charge the surface of every other sheet to inverse the electrostatic polarity. More specifically, the bias application roller pair applies, to the sheet P, charges opposite in polarity to the surface potential of the image-formed sheet. In this way, the surface potential of the sheet P before passing through the bias application roller pair and that after passing through the bias application roller pair are reversed. FIG. 13 illustrates a state of stacked sheets P in the case where the reverse polarity charges is applied to every even-numbered sheet P. When the first to fourth sheets are respectively referred to as sheets P1 to P4, the sheets P1 and P3 are stacked in a state where the upper surface of each of the sheet P1 and P3, to which the voltage is not applied by the charge adjusting unit 329, is negatively charged, and the lower surface thereof is positively charged. The sheets P2 and P4 are stacked in a state where the upper surface of each of the sheets P2 and P4, which is charged by the charge adjusting unit 329 so that the electrostatic polarity of the sheet surface is reversed with respect to the sheets P1 and P3, is positively charged and the lower surface thereof is negatively charged. Since the surfaces of the sheets are charged so as to repel each other in this way when the sheets are stacked, it is possible to prevent the sheets from sticking to each other due to electrostatic force. However, the arrangement of the high-voltage substrate 430 is not limited thereto. The bias application roller 330*b* may be electrically grounded (connected to the ground) and the high-voltage substrate 430 may apply a positive voltage to the bias application roller 330*a*. In addition, two high-voltage substrates may be respectively connected to the bias application rollers 330*a* and 330*b*.

Similar to the above-described embodiment, the charge adjusting apparatus 303 includes the operation unit 332. The operation unit 332 includes the mode lever 141 for manually switching "ON" and "OFF" of the voltage application, and the dial 142 for manually setting the voltage to be applied. FIG. 14 is a table illustrating relationships respectively between settings of the mode lever 141 and the dial 142, and voltage application operations in the charge adjusting unit 329, according to the present embodiment. When the mode lever 141 is in an on state, a voltage is applied to the bias application roller pair for every other sheet. For example, a voltage of the dial value×−100 V is applied to the bias application roller pair for every even-numbered sheet P, and no voltage is applied thereto for every odd-numbered sheet P. In an opposite way, the voltage may be applied to the bias application roller pair for every odd-numbered sheet P, and no voltage may be applied to the bias application roller pair for every even-numbered sheet P. However, in a case where the dial value is 0, no voltage is applied to the bias application roller pair, and no charge is provided to any of the conveyed sheets P. Then, when the mode lever 141 is in an off state, regardless of the dial value of the dial 142, no voltage is applied to the bias application roller pair, and no charge is provided to any of the conveyed sheets P. As described above, it is possible to obtain the similar effect to the above-described embodiment when the charge adjusting apparatus 303 includes the two manual setting units of the dial 142 serving as the first setting unit and the mode lever 141 serving as the second setting unit.

According to the present invention, it is possible to provide a charge eliminating apparatus, an image forming apparatus, and a charge adjusting apparatus in which the operation to perform the setting regarding the charge eliminating (charge removal) of the sheet or a sheet electric charge adjustment is improved.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2023-011451, filed Jan. 30, 2023, and No. 2023-197019, filed Nov. 20, 2023, which are hereby incorporated by reference herein in their entirety.

What is claimed is:

1. A charge eliminating apparatus configured to remove charges from a sheet on which an image is formed by a printing apparatus, the charge eliminating apparatus comprising:

a charge eliminating roller pair including a first charge eliminating roller and a second charge eliminating roller configured to form a nip portion together with the first charge eliminating roller, the charge eliminating roller pair being configured to remove the charges from the sheet in a state of contacting the sheet at the nip portion;

a first setting unit configured to set a value of a voltage applied to the charge eliminating roller pair; and a second setting unit configured to set whether to apply the voltage to the charge eliminating roller pair, wherein the second setting unit is configured to set whether to apply the voltage to the charge eliminating roller pair without changing the value of the voltage set by the first setting unit.

2. The charge eliminating apparatus according to claim 1, wherein the first setting unit is a thumb rotary switch, and wherein the second setting unit is a selector switch.

3. The charge eliminating apparatus according to claim 1, wherein the first setting unit and the second setting unit are arranged on an outer surface of the charge eliminating apparatus.

4. The charge eliminating apparatus according to claim 1, further comprising a display unit configured to display the first setting unit and the second setting unit.

5. The charge eliminating apparatus according to claim 1, further comprising a control unit configured to change the voltage applied to the charge eliminating roller pair after a job ends, without changing the voltage applied to the charge eliminating roller pair until the job ends, in a case where a setting of the value of the voltage applied to the charge eliminating roller pair is changed by the first setting unit in a middle of the job.

6. The charge eliminating apparatus according to claim 1, further comprising a non-contact charge eliminating unit configured to remove the charges from the sheet at a position downstream of the charge eliminating roller pair in a state of not contacting the sheet, wherein a voltage is applied to the non-contact charge eliminating unit even in a case where a setting by the second setting unit is not to apply the voltage to the charge eliminating roller pair.

7. The charge eliminating apparatus according to claim 1, wherein the charge eliminating roller pair conveys the sheet even in a case where a setting by the second setting unit is not to apply the voltage to the charge eliminating roller pair.

8. An image forming apparatus, comprising:

the charge eliminating apparatus according to claim 1; and the printing apparatus.

9. A charge adjusting apparatus configured to adjust charges on a sheet on which an image is formed by a printing apparatus, the charge adjusting apparatus comprising:

a bias application roller pair configured to provide charges opposite in polarity to a surface potential of the sheet on which the image is formed, so that the surface potential of the sheet on which the image is formed is reversed;

a first setting unit configured to set a value of a voltage to be applied to the bias application roller pair; and a second setting unit configured to set whether to apply the voltage to the bias application roller pair, wherein the second setting unit is configured to set whether to apply the voltage to the bias application roller pair without changing the value of the voltage set by the first setting unit.

10. The charge adjusting apparatus according to claim 9, wherein the bias application roller pair provides, to every other sheet, charges opposite in polarity to the surface potential of the sheet on which the image is formed.

11. A charge eliminating apparatus configured to remove charges from a sheet on which an image is formed by a printing apparatus, the charge eliminating apparatus comprising:

a charge eliminating roller pair including a first charge eliminating roller and a second charge eliminating roller configured to form a nip portion together with the first charge eliminating roller, the charge eliminating roller pair being configured to remove the charges from the sheet in a state of contacting the sheet at the nip portion;

a first setting unit configured to allow a user to input information corresponding to a value of a voltage applied to the charge eliminating roller; and a second setting unit configured to allow a user to select whether to apply the voltage to the charge eliminating roller pair, wherein, in a case where the user selects, on the second setting unit, not to apply the voltage to the charge eliminating roller pair, the sheet is conveyed in a state where the voltage is not applied to the charge eliminating roller pair regardless of the information input to the first setting unit.

12. The charge eliminating apparatus according to claim 11, wherein the first setting unit is a thumb rotary switch, and wherein the second setting unit is a selector switch.

13. The charge eliminating apparatus according to claim 11, wherein the first setting unit and the second setting unit are arranged on an outer surface of the charge eliminating apparatus.

14. The charge eliminating apparatus according to claim 11, further comprising a display unit configured to display the first setting unit and the second setting unit.

15. The charge eliminating apparatus according to claim 11, further comprising a non-contact charge eliminating unit configured to remove the charges from the sheet at a position downstream of the charge eliminating roller pair in a state of not contacting the sheet, wherein a voltage is applied to the non-contact charge eliminating unit even in a case where the user selects, on the second setting unit, not to apply the voltage to the charge eliminating roller pair.

16. An image forming system, comprising:

image formation units configured to form an image on a sheet;

a charge eliminating roller pair including a first charge eliminating roller and a second charge eliminating roller configured to form a nip portion together with the first charge eliminating roller, the charge eliminating roller pair being disposed downstream of the image formation units in a sheet conveyance direction, and the charge eliminating roller pair being configured to remove the charges from the sheet in a state of contacting the sheet at the nip portion;

a first setting unit configured to allow a user to input information corresponding to a value of a voltage applied to the charge eliminating roller; and a second setting unit configured to allow a user to select whether to apply the voltage to the charge eliminating roller pair, wherein, in a case where the user selects, on the second setting unit, not to apply the voltage to the charge eliminating roller pair, the sheet is conveyed in a state where the voltage is not applied to the charge eliminating roller pair regardless of the information input to the first setting unit.

17. The image forming system according to claim 16, further comprising:

a printing apparatus including the image formation units and a first housing configured to accommodate the image formation units; and a charge eliminating apparatus including the charge eliminating roller pair and a second housing configured to accommodate the charge eliminating roller pair, wherein the first setting unit and the second setting unit are disposed in the printing apparatus.

18. The image forming system according to claim 16, wherein the first setting unit and the second setting unit are arranged on an outer surface of the charge eliminating apparatus.

19. The image forming system according to claim 16, further comprising a display unit configured to display the first setting unit and the second setting unit.

20. The image forming system according to claim 16, further comprising a non-contact charge eliminating unit configured to remove the charges from the sheet at a position downstream of the charge eliminating roller pair in a state of not contacting the sheet, wherein a voltage is applied to the non-contact charge eliminating unit even in a case where the user selects, on the second setting unit, not to apply the voltage to the charge eliminating roller pair.

* * * * *